United States Patent [19]

Campbell

[11] 4,015,261
[45] Mar. 29, 1977

[54] TIME SHARING CIRCUIT FOR GUARD RADAR RECEIVER IN RADAR RANGING SYSTEM

[75] Inventor: Robert R. Campbell, Towson, Md.

[73] Assignee: The United States of America as represented by the Secretary of the Navy, Washington, D.C.

[22] Filed: Jan. 7, 1964

[21] Appl. No.: 336,318

[52] U.S. Cl. .................................. 343/18 E; 343/9; 343/17.1 PF

[51] Int. Cl.$^2$ ...................... G01S 7/36; G01S 9/10; G01S 9/48

[58] Field of Search ................ 343/5, 7.7, 8, 9, 11, 343/16, 17.1, 18, 17.1 PF, 18 E; 325/301–306, 362

[56] References Cited
UNITED STATES PATENTS 3,701,989  10/1972  Calhoon, Sr. et al. ............ 343/9 X

*Primary Examiner*—Malcolm F. Hubler
*Attorney, Agent, or Firm*—R. S. Sciascia; Paul S. Collignon

EXEMPLARY CLAIM

1. A time sharing circuit for a multiple pulse repetition frequency, pulse-Doppler target bearing and ranging radar having dual antenna horns with a receiver and a plurality of range channels coupled in a receiver channel from each antenna horn to a data processor with the plurality of range channels in each receiver channel being in parallel, and having a pulse repetition frequency switching means coupled to control transmission of different pulse repetition frequencies in sequence, the invention which comprises:

first and second alternately poled switches in the coupling of said receiver and one range channel of each receiver channel, the switch blade of each switch being coupled to the respective range channel and one pole of each switch being coupled to the respective receiver;

means adding the outputs of said receivers, the summation being coupled to the alternate pole of one of said alternately poled switches;

a guard receiver having an output coupled to the alternate pole of the other alternately poled switch;

means subtracting the outputs of said one range channel of each receiver channel, the quotient thereof being coupled to said data processor; and means for actuating said alternately poled switches by control means of said pulse repetition frequency switching means and said data processor to time share alternate switch positions of said alternately poled switches for different pulse repetition frequencies and to maintain said guard receiver in circuit with the respective range channel when target and jamming signals are received.

8 Claims, 1 Drawing Figure

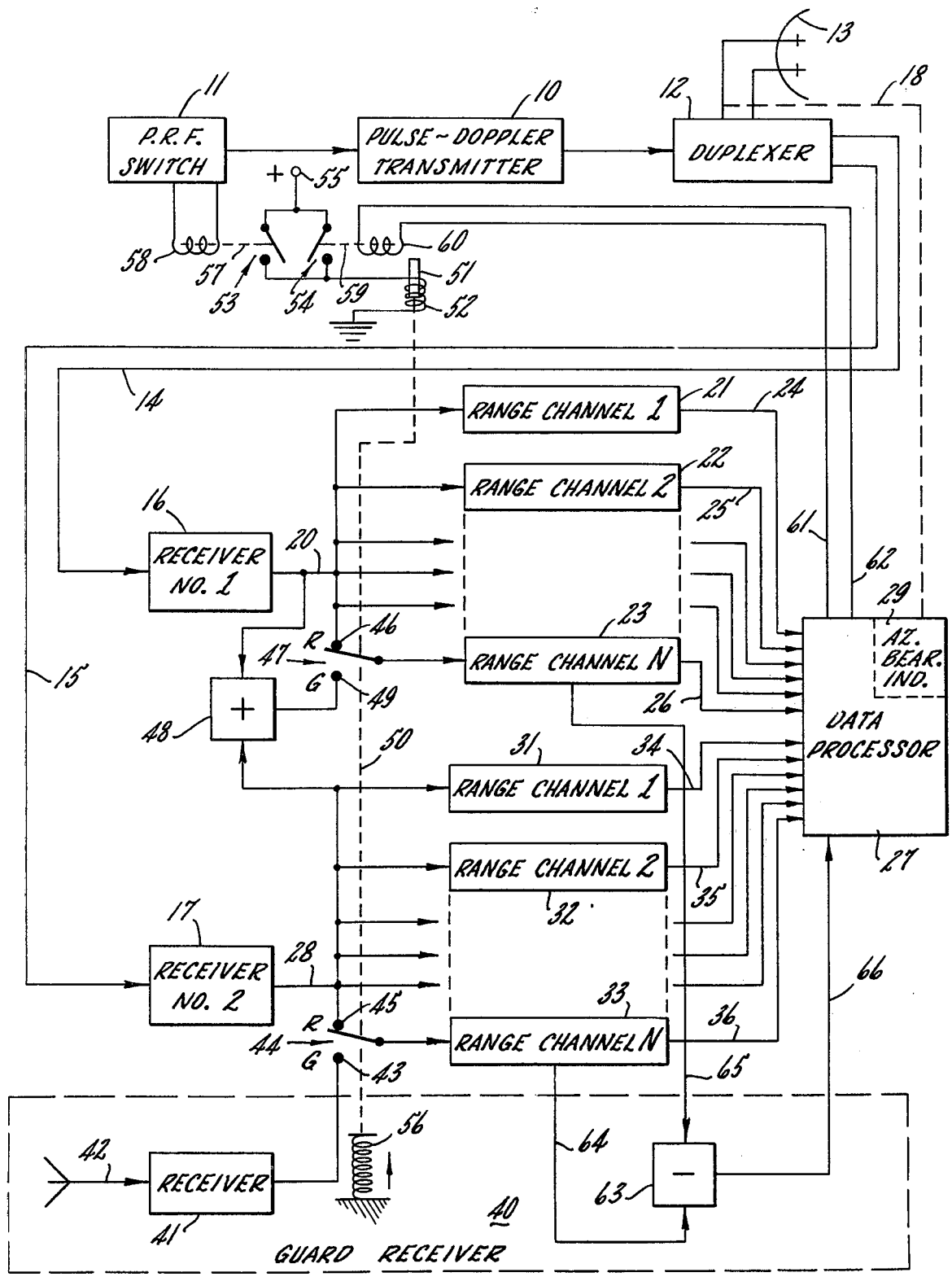

TIME SHARING CIRCUIT FOR GUARD RADAR RECEIVER IN RADAR RANGING SYSTEM

This invention relates to a time sharing circuit and more particularly to a circuit for time sharing a guard radar receiver in a portion of the reception channels of a pair of radar ranging and bearing receivers to determine the bearing and range of a noise jammer.

Radar receivers are often actively jammed by jamming signals produced with enemy radar in enemy target objects to obscure and confuse the real target object in the receiver. It is the purpose of some jammers to completely obscure target information in the receiver by "brute force" while the purpose of other jammers is to create mutations in the target information to deceive receiver operation sufficiently to render target echo signals tactically useless. These are repeater type jammers which can be foiled, or the effects thereof reduced, by changing the pulse repetition frequency (PRF) two or more times to make it difficult for the jammer to mimic. In addition to this, where barrage jammers are used to radiate noise over a relatively wide frequency band, the jammer signals can be used for obtaining a bearing of the target object using it as a beacon. The choice of providing antijamming circuits of tolerating and using the jam signals in a receiver is one of design discretion for a particular purpose, the latter being the preference in this invention.

This invention is used in conjunction with a pulse-Doppler, multiple PRF radar ranging system capable of determining the bearing of a target object. This radar system utilizes a pair of vertically oriented transmitter and receiver horns in the antenna to each of which is coupled a radar receiver channel to obtain elevational information of target objects. Each receiver channel has the output thereof separated in time by a plurality of range channels, the outputs of which are coupled to a data processor for storing, sampling, and displaying target information. This invention also contemplates the use of a wide band guard receiver that may use an omnidirectional antenna for receiving echo signals from the principle pulse Doppler and multiple PRF radar transmitter as well as all jam signals. One range channel in each receiver channel is coupled to the switch blade of an alternately poled switch. One pole of the alternately poled switch for one receiver channel is coupled to the output of the receiver while the alternate pole of this alternately poled switch is coupled as an output of an adding circuit, the inputs to which adding circuit are coupled respectfully to the outputs of the two receivers in both channels. One pole of the other alternately poled switch is coupled to the output of the second receiver while the alternate pole is coupled to the guard receiver to switch the alternately poled switches from the normal receiver position to the guard receiver position. The alternately poled switches are actuated by means under control of the PRF switching means of the radar transmitter and from an output of the data processor to switch the alternately poled switches to the receiver position under certain predetermined PRF transmissions and to the guard switch position under other predetermined PRF transmitting conditions. Upon target acquisition the data processor control is operative to switch the alternately poled switches to the guard position for a time to process target and jamming signals to obtain bearing and range of the target and/or jamming signals. It is therefore a general object of this invention to provide a pulse-Doppler, multiple PRF twin receiver channel radar system having a guard receiver in conjunction therewith that is time shared with a portion of the twin receiver channel of the radar to obtain accurate bearing of a target object producing jamming signals.

These and other objects and attendant advantages, features, and uses of the invention will become more apparent to those skilled in the art as the description proceeds in conjunction with the FIGURE of drawing illustrating the invention in block circuit schematic diagram.

Referring more particularly to the FIGURE of the drawing, the pulse-Doppler radar transmitter is illustrated by a block 10 to which is coupled a PRF switching means 11 which may in actual practice constitute an actual part of the radar transmitter but is herein shown separately for the purpose that will hereinafter become clear. The pulse-Doppler transmitter 10 is coupled through a duplexing circuit 12 to an antenna 13 for the transmission and reception of the pulse-Doppler signals. The antenna 13 is of the type having two horns positioned in a vertical plane with each horn coupled through the duplexer mechanism 12 through the leads 14 and 15 to the radar receivers 16 and 17. The pulse-Doppler transmitter 10 is switched by the PRF switch 11 to produce pulsing of the Doppler signals at different repetition frequencies to reduce the probability of radar jamming, as is well understood in the radar countermeasure and antijamming art. While any number of different PRFs may be switched into the transmitter 10, it is generally preferred to use three different PRFs switched sequentially to allow each PRF to be used for an equal time during the dwell time of the scanning antenna on a target. The antenna 13 is oscillatory or partially rotatable throughout an arc with mechanical or synchro azimuth bearing takeoff means illustrated by the broken line 18, as is well understood by those skilled in the radar target tracking art.

Receiver No. 1, herein identified by the reference character 16, has an output 20 to a plurality of range channels 21, 22, and 23 which are shown as range channels 1, 2, and N, respectively. A number of range channels between channel 2 and channel N are eliminated from the illustration although it is to be understood that a plurality of range channels as 1 and 2 through N are coupled to the output of the receiver No. 1 and gated by a gating circuit (not shown) as well understood by those skilled in the radar art. The outputs of range channels 1 and 2 through N are coupled by conductor means 24, 25, and 26, respectively, as inputs to a data processor 27. In like manner receiver No. 2, identified herein by the reference character 17, has an output 28 coupled in parallel to range channels 31, 32, and 33 as shown. Range channel 31 is range channel 1 for the receiver 17, range channel 32 is identified as channel 2 for the receiver No. 2, and all range channels following range channel 2 through range channel N, the letter channel N being identified by the reference character 33, are coupled in parallel to the output 28 of receiver No. 2 and gated by a gating circuit (not shown) in a well-known manner. Range channels 31, 32, and 33 have their outputs 34, 35, and 36 coupled respectively as inputs to the data processor 27. The mechanical or servo system coupling 18 is coupled to an azimuth bearing indicator 29 within the data processor so that it may be observed along with the cathode ray tube display of the data processor although the azimuth bearing inductor 29 may be separate from the data processor 27 in the actual practice of the invention. The circuit as thus far described would produce range and bearing information as well as elevational information for a target object which is illuminated by the transmitted pulses in a manner well understood by those skilled in the art. Any such targets acquired by the system could be obscured or reduced greatly in tactical effects by jamming signals and, accordingly, measures are taken by this invention to reduce the effects of these jamming signals.

One range channel of each receiver channel is time shared with a guard receiver 40 which has a wide-band radar receiver 41 coupled to receive a wide-band of frequency including echo signals transmitted by the antenna 13 over the antenna means 42 which may be of an omnidirectional type. The output of the guard receiver 41 is coupled to a terminal means 43 of an alternately poled switch 44 having the switch blade thereof coupled as an input to the range channel N or 33 of receiver channel No. 2. Terminal 45 is coupled directly to the output 28 of receiver No. 2. In like manner terminal 46 is coupled to the output 20 of receiver No. 1, the switch blade of this alternately poled switch 47 being coupled as the input to range channel N or 23 of receiver channel No. 1. The outputs 20 and 28 of receivers 16 and 17 are coupled as inputs to an adding circuit 48, the output of which is coupled to the alternate terminal 49 of the alternately poled switch 47. The switch blades of the alternately poled switches 44 and 47 are actuatable by a relay pole means 50 having an armature 51 within a relay coil 52 which is in circuit through switches 53 and 54 to a voltage source at 55. The switches 53 and 54 normally rest in the open condition and the switch blades of the alternately poled switches 44 and 47 normally rest in the upper or R position by reason of the spring bias 56 on the armature 50, 51. The switch 53 has an armature 57 operative within a relay coil 58 coupled to the PRF switching means 11 to close switch 53 for predetermined PRFs to be transmitted by the radar transmitter 10. Switch 54 has an armature 59 under the control of a relay coil 60 which is energized by a circuit in the data processor over the leads 61 and 62. The leads 61 and 62 are energized to energize the relay coil 60 whenever a target or jamming signal is received by the receivers No. 1 and No. 2. While the alternately poled switches 44 and 47 and the switches 53 and 54 are illustrated herein as being of the relay mechanical type, it is to be understood that these switches are so illustrated for simplicity and clarity of description although these switches may preferably be of the electronic type to provide exceedingly rapid switching operation. The guard receiver 40 also includes a subtraction circuit 63 which subtracts the output of range channel 33 over the conductor means 64 from the output of range channel 23 coming by way of conductor means 65, the quotient output thereof being conducted by way of conductor means 66 to the data processor. The outputs 64 and 65 are taken from range channels N in each of the receiver channels, these outputs being equal and of no effect to produce a quotient over the conductor means 66 when the alternately poled switches 44 and 47 are in the R or receiver position.

OPERATION

In the operation of the device let it be assumed that the pulse-Doppler radar 10 is transmitting signals over the antenna 13 with the PRFs transmitted in a sequence to allow equal dwell time over any scanned portion for the antenna 13. Let it further be assumed that the PRF switch 11 switches three different PRFs, the first PRF of which does not energize the relay 53, 57, 58 whereby the alternately poled switches 44 and 47 remain in the R position. When PRF switch 11 switches to the second and third PRFs, switch 53 is thrown to energize the relay coil 52 to switch the alternately poled switches 44 and 47 to the G or the guard receiver position. Under these conditions the N range channel of each receiver channel is not being used during two of the three PRFs. During these two transmitted PRFs the two range channels N are used for the guard receiver. If target or jamming signals are received in the antennaes 13 and 42, there would be a small bearing error of the target since the two range signals 23 and 33 are used for the guard receiver only two-thirds of the time. However, the presence of a target or jamming signal in the data processor produces energization of the relay switch 54 which will hold the alternately poled switches 44 and 47 in the G position whereby the range channels 23 and 33 would be operating full time. Some range increments would be eclipsed by holding the alternately poled switches 44 and 47 in the G position for range channels 23 and 33 but this would have negligible effects in the operation of the radar and in obtaining the bearing of the target or jamming source since the range of the target or jamming source is being channeled by range channels 1 and 2 through the range channels up to but not including range channel N in each receiver channel. Once the bearing of the target or jamming source is determined with the bearing error thereof by virtue of the guard receiver operating for only two-thirds of the time, this error would be stored in the data processor but would be reduced to zero error after operation of the system in the guard position of the alternately poled switches 44 and 47. As hereinbefore stated the outputs of range channels 23 and 33 through the subtracting circuit 63 would produce a zero output on 66 to the data processor when the alternately poled switches 44 and 47 are in the R position. When switches 44 and 47 are in the G position, the amplitude of any echo signal and noise jamming signal from both receivers No. 1 and No. 2 are added in the adding circuit 48, the output of which is from the range channel 23 applied over conductor means 65 to the subtraction circuit 63. The output of the jamming signal received over the antenna 42 from the guard receiver 41 is applied through range channel 33 and subtracted in the subtracting circuit 63 to provide target signal less jamming signal information over the output 66 to the data processor 27 clearly indicating the target and its bearing from this radar system. In this manner accurate azimuth bearing can be obtained of a target producing jam signals which would ordinarily obscure or confuse the radar receiver.

While many modifications and changes may be made in the constructional details and features of this invention by greater sophistication of the illustrated switches or circuit components to accomplish the same scope of the invention illustrated and described herein, it is to b· understood that I desire to be limited in my invention only by the spirit and scope of the appended claims.

I claim:

1. A time sharing circuit for a multiple pulse repetition frequency, pulse-Doppler target bearing and ranging radar having dual antenna horns with a receiver and a plurality of range channels coupled in a receiver channel from each antenna horn to a data processor with the plurality of range channels in each receiver channel being in parallel, and having a pulse repetition frequency switching means coupled to control transmission of different pulse repetition frequencies in sequence, the invention which comprises:

first and second alternately poled switches in the coupling of said receiver and one range channel of each receiver channel, the switch blade of each switch being coupled to the respective range channel and one pole of each switch being coupled to the respective receiver;

means adding the outputs of said receivers, the summation being coupled to the alternate pole of one of said alternately poled switches;

a guard receiver having an output coupled to the alternate pole of the other alternately poled switch;

means subtracting the outputs of said one range channel of each receiver channel, the quotient thereof being coupled to said data processor; and means for actuating said alternately poled switches by control means of said pulse repetition frequency switching means and said data processor to time share alternate switch positions of said alternately poled switches for different pulse repetition frequencies and to maintain said guard receiver in circuit with the respective range channel when target and jamming signals are received.

2. A time sharing circuit for a multiple pulse repetition frequency, pulse-Doppler radar having two antenna horns with a first and a second receiver coupled to each antenna horn and having a pulse repetition frequency switching means coupled to control the transmission sequence of the pulse repetition frequencies, the invention which comprises:

a data processor;

a first plurality of range channels coupled between said first receiver and said data processor and a second plurality of range channels coupled between said second receiver and said data processor, one range channel in each plurality of range channels being coupled to the first and second receivers through first and second alternately poled switches, respectively;

means adding the outputs of said first and second receivers, the summation being applied to the alternate pole of said first alternately poled switch;

a guard receiver having an output coupled to the alternate pole of said second alternately poled switch;

means subtracting the output of the one range channel in said second plurality of range channels from the one range channel in said first plurality of range channels, the quotient therefrom being applied to said data processor; and means controlled by said data processor and said pulse repetition frequency switching means to alternately switch said first and second alternately poled switches to time share said guard receiver with said two receivers to said one range channels.

3. A time sharing circuit as set forth in claim 2 wherein said means adding the outputs of said first and second receivers is an adding network and said means subtracting the outputs of said one range channels in a subtraction network.

4. A time sharing circuit as set forth in claim 3 wherein said pulse repetition frequency switching means controls said means controlled by said data processor and said pulse repetition frequency switching means to switch said first and second alternately poled switches to one pole for predetermined pulse repetition frequencies transmitted and to the alternate pole for other predetermined pulse repetition frequencies, and said data processor will control said means controlled by said data processor and said pulse repetition frequency switching means to switch said first and second alternately poled switches to the alternate poles when target and jam signals are processed by said data processor.

5. A time sharing circuit for a multiple pulse repetition frequency, pulse-Doppler radar comprising:

a pulse-Doppler radar transmitter-receiver system having dual antenna horns and first and second receivers coupled respectively to each antenna horn, and having a pulse repetition frequency switching means for causing the transmitter to transmit pulse-Doppler signals at a plurality of different pulse repetition frequencies;

a data processor;

a first plurality of range channels coupled between said first receiver and said data processor and a second plurality of range channels coupled between said second receiver and said data processor, the last range channel of each plurality of range channels having first and second alternately poled switches in said coupling to said first and second receivers, said first and second alternately poled switches being biased to place said last range channels in connection with the respective receivers;

an adding network coupled to add the outputs of said first and second receivers, the output of said adding network being coupled to the alternate pole of said first alternately poled switch;

a guard receiver having an output coupled to the alternate pole of said second alternately poled switch;

a subtraction network coupled to subtract the output of the last range channel of the second plurality of range channels from the last range channel of said first plurality of range channels, the output of said subtraction network being coupled to said data processor; and means controlled by said data processor and said pulse repetition frequency switching means to switch said first and second alternately poled switches to time share the first and second receivers and the guard receiver for predetermined pulse repetition frequencies.

6. A time sharing circuit as set forth in claim 5 wherein said dual antenna horns are positioned vertically to provide elevational information of a target object.

7. A time sharing circuit as set forth in claim 6 wherein said guard receiver has an omnidirectional antenna for receiving echo signals produced by said transmitted pulse-Doppler signals.

8. A time sharing circuit for a multiple pulse repetition frequency, pulse-Doppler radar comprising:

a pulse-Doppler radar transmitter-receiver system having dual antenna horns for scanning and establishing azimuth bearing and first and second receivers coupled respectively to each antenna horn, and having a pulse repetition frequency switching means for causing the transmitter to transmit pulse-Doppler signals at a plurality of different pulse repetition frequencies in sequence;

a data processor;

a first plurality of range channels coupled between said first receiver and said data processor and a second plurality of range channels coupled between said second receiver and said data processor, one range channel of said first plurality of range channels being coupled to the switch blade of a first alternately poled switch having one pole thereof coupled to the output of said first receiver, and one range channel of said second plurality of range channels being coupled to the switch blade of a second alternately poled switch having one pole coupled to the output of said second receiver;

an adding network coupling the outputs of said first and second receivers, the output thereof being coupled to the alternate pole of said first alternately poled switch;

a guard receiver having an output coupled to the alternate pole of said second alternately poled switch;

a subtracting network coupled to subtract the output of said one range channel of said second plurality of range channels from the output of said one range channel of said first plurality of range channels, the output of said subtracting network being coupled as an input to said data processor; and actuating means for actuating said first and second alternately poled switches, said actuating means being controlled by said pulse repetition frequency switching means to time share the two receivers with said guard receiver, and said actuating means being controlled by said data processor to switch said alternately poled switches to said guard receiver whenever either target echo and jam signals are present in the received signals of said two receivers.

* * * * *